United States Patent [19]

Newsome

[11] Patent Number: 5,328,649
[45] Date of Patent: Jul. 12, 1994

[54] APPARATUS AND METHOD FOR REPAIRING GLASS WINDSHIELD OR THE LIKE

[76] Inventor: Joyce D. Newsome, 311 W. Main, Monroe, Wash. 98272

[21] Appl. No.: 966,452

[22] Filed: Oct. 26, 1992

[51] Int. Cl.$^5$ .............................................. B32B 35/00
[52] U.S. Cl. ............................ 264/36; 156/94; 264/35; 264/40.1; 425/12; 425/13; 425/135; 425/150; 427/140
[58] Field of Search ............................ 264/31-36, 264/40.1; 425/11-14, 135, 150; 156/94, 98; 427/140

[56] References Cited

U.S. PATENT DOCUMENTS

| | | | |
|---|---|---|---|
| 3,988,400 | 10/1976 | Luhman, III | 156/94 X |
| 3,993,520 | 11/1976 | Werner et al. | 425/13 X |
| 4,208,229 | 6/1980 | Giardini | 156/98 X |
| 4,594,119 | 6/1986 | Baldassari | 156/94 |
| 4,681,520 | 7/1987 | Birkhauser, III | 264/36 X |
| 4,820,148 | 4/1989 | Anderson | 425/13 X |
| 4,921,411 | 5/1990 | Ottenheimer | 425/13 X |
| 4,954,300 | 9/1990 | Dotson | 264/36 |
| 4,975,037 | 12/1990 | Freiheit | 264/36 X |
| 5,028,223 | 7/1991 | Ameter | 425/13 X |

*Primary Examiner*—Karen Aftergut
*Attorney, Agent, or Firm*—Mark Zovko

[57] ABSTRACT

Apparatus and method for repairing breaks in glass bodies such as car windshields. A position indicator is used in conjunction with a repair bridge for precisely locating the break to be repaired. A conventional resin injector can be used in the slot taken by the position indicator once the position indicator has been used and removed from the bridge. Realignment or further adjustment of the bridge can thereby be avoided making the repair process more efficient.

2 Claims, 1 Drawing Sheet

APPARATUS AND METHOD FOR REPAIRING GLASS WINDSHIELD OR THE LIKE

FIELD OF THE INVENTION

This invention relates in general to repair of glass using injected resin and more particularly to an improved bridge for use with a resin injector for repair of windshields or the like.

BACKGROUND OF THE INVENTION

When glass, and more particularly a windshield, is struck by an object or projectile such as a rock, the outer glass pane is likely to be damaged. As is well known in the prior art, a shatterproof windshield is composed of an intermediate plastic laminate which bonds an outer glass pane and an inner glass pane together. This combination of glass-plastic laminations absorbs the force of impact, thereby reducing the extent of the damage to the windshield.

Upon impact, glass on the surface of a windshield fractures into a simple crack, or a cone-like formation with damage directed radially therefrom in several directions. When a cone is formed, it normally has a peak on the surface which is often exposed to the atmosphere. The base of the cone typically extends to the bottom of the outer glass pane adjacent the plastic laminate. The sides of this cone, as well as any related fractures that may have formed, are visible to an observer looking through the windshield. Indeed, as light is transmitted through these new interfaces that have formed within the glass, extraneous refraction thereof occurs.

The damage to the windshield, conventionally categorized as a simple crack, a bull's-eye, a star, or a combination thereof, is typically small and confined to the outside glass layer. In the case of bull's-eyes, the fracture planes usually run parallel to the glass surface, sloping downwards. The presence of these fracture planes, which may cover a significant portion of the windshield, can be distracting to the driver and interfere with his line of vision. Furthermore, the presence of fractures, showing as cracks, constitutes points of weakness within the outer glass pane. As is well known to those skilled in the art, such cracks are apt to propagate further, resulting in substantial interference with the driver's vision. Accordingly, to avoid a collision caused by such visual distractions and inhibited line of sight, expensive replacement of the windshield is required.

On the other hand, if this damaged glass could have been repaired prior to the propagation of the cracks by filling the voids within the said damage whereby the fracture planes were properly bonded together, such conventional and costly replacement of the windshield could be avoided.

As is also well known in the prior art, through the use of resins which have refractive indexes substantially the same as that of glass, suitable viscosity, suitable adhesion to glass, and are non-yellowing, it is possible to repair damaged glass and accordingly extend a windshield's life.

Thus, if such resin is injected properly into the damaged glass by one skilled in the art, the interfaces hereinbefore described may be nearly invisible. If such a resin has been applied improperly, however, the damage will still be visible, showing voids, and of course have fracture panes that are not bonded together, thereby resulting in cracked glass which is apt to continue to fail.

It is therefore important to properly inject the resin into the damaged glass. At times this may require halting the injection process to inspect the break and then injecting more resin after inspection. In conventional apparatus, this requires removal of the bridge supporting the injector from the glass and repositioning of the bridge after inspection. When repairing numerous breaks per day, removing the bridge from the glass for inspection results in significant lost time. It is highly desirable to provide a bridge and injection apparatus which can be accurately positioned on the break eliminating the need for further removing and repositioning of the entire bridge.

A search of the prior art produced the following patents, all of which are issued in the United States.

U.S. Pat. Nos.
3,562,366
4,047,863
4,597,727
4,814,185
4,919,602
4,995,798

It is submitted that these patents do not show the key features such as the position indicator of the present invention.

SUMMARY OF THE INVENTION

The present invention provides improved apparatus for repairing breaks in glass bodies such as car windshields. The method comprises initially aligning a repair bridge adjacent to the break to be repaired. The bridge has a slot disposed therein which receives a position indicator. The position indicator is fixed temporarily to the bridge and a pointed cylindrical portion slidably engaged to the position indicator is pushed toward the break. When the tip of the cylindrical portion of the position indicator contacts the break in the glass body at a predetermined point, the bridge can be levelled with an adjustable brace and fastened to the glass body preferably using a suction cup. The position indicator is then removed from the slot in the bridge, and a conventional resin injector placed in the slot. Resin can then be injected into the break at the exact predetermined point located by the position indicator. Realignment or further adjustment of the bridge can be thereby avoided and the entire process made more efficient and accurate.

The apparatus used to carry out the invention would include a bridge having an open slot at one of its ends. The bridge would have a suction fastener disposed within it which would allow a rubber suction cup to contact the glass body. The bridge would also have an adjustable bridge brace having a swivel tip which contacts the glass body. The adjustable brace is used to level the bridge with respect to the glass body to be repaired. The position indicator is dropped within the slot of the bridge and its slidable pointed cylindrical portion pushed forward until it contacts the break at a predetermined point. The bridge can then be levelled and fastened to the glass body. The position indicator is then removed from the slot to make room for the resin injector which fits within the same slot in the bridge after the position indicator is removed. The resin injector used can be a conventional type of injector which contains resin precharged into a cavity within the injector and injects this resin into the break as a top portion acting as a piston and threaded to the injector forces the resin into the break as the top portion of the injector is turned clockwise.

To facilitate the rapid use of the position indicator and resin injector, the bridge can preferably have a quick release locking assembly located over the slot. This assembly has a flange which can engage a suitable flange on the position indicator to a temporary fixing of the indicator's position. Similarly, the resin injector can have a flange which engages the locking assembly of the bridge allowing quick fixing and release of the resin injector.

Having summarized the invention, the object of the present invention is to provide apparatus for repair of glass, especially car windshields, which allows the bridge to be accurately positioned over the break in the glass body to be repaired.

A further object of the present invention is to provide apparatus for repairing cracks in glass windshields which will allow for more rapid repair.

Another object of the present invention is to provide apparatus for repairing cracks in glass windshields which will increase the efficiency of repair.

These and other objects and advantages of the present invention will become more apparent from the following detailed description when taken in conjunction with the attached drawings.

DETAILED DESCRIPTION OF THE PREFERRED EMBODIMENT

Figure 1:
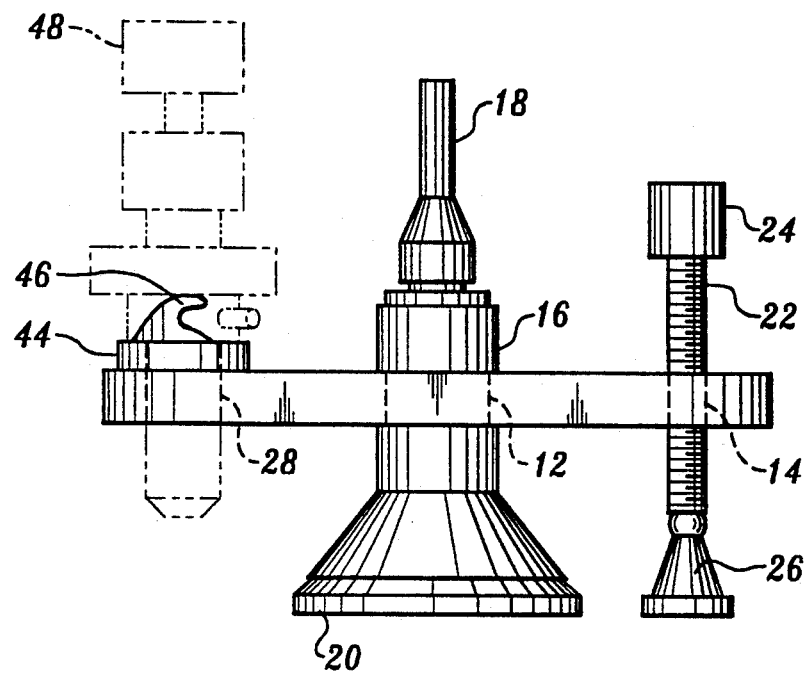
FIG. 1 is a side elevation of the apparatus of the present invention.
Figure 1A:
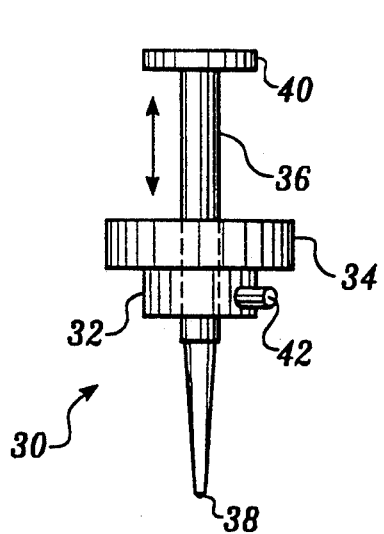
FIG. 1A is a side elevation view of the position indicator of the present invention.

Referring to the Figures, a bridge generally designated as 10 is shown for use in repairing simple cracks, stars, or bull's eyes in a glass windshield. The bridge 10 has holes 12 and 14 therethrough. Hole 12 receives a suction fastener designated as 16. Fastener 16 is well known in the art and has a handle 18 and a rubber suction cup 20 which contacts the glass body to be repaired when the apparatus is in use. Handle 18 co-acts with the suction cup 20 so as to force the suction cup 20 onto the glass body when the bridge 10 is in position over the glass body and the handle 18 pushed downward. An adjustable bridge brace 22 is provided which fits threadably through hole 14. The purpose of brace 22 is to level the bridge 10 with respect to the glass body. The brace has a finger handle 24 which allows vertical adjustment and a plastic swivel tip 26 useful for alignment of the bridge 10 on curved surfaces.

Bridge 10 also has a slot 28 therein. Slot 28 is reserved to receive position indicator 30 when the apparatus is being used. Position indicator 30 has an outer cylindrical portion 32 with a finger handle 34. Disposed within the outer cylindrical portion 32 and slidably engaged thereto is an elongated cylindrical portion 36 having a pointed tip 38 at one end for contact with the break to be repaired and a thumb rest 40 at its other end for sliding the elongated portion 36 within the outer cylindrical portion 32. It should be noted that the outer cylindrical portion 32 has a flange 42 thereon for mating engagement with a quick release assembly 44 on the bridge 10. Quick release assembly 44 has a flange 46 which can engage flange 42 of position indicator 30 and lock the position indicator into place over the break in the glass body. The quick release assembly 44 is positioned over the slot 28 of bridge 10.

Figure 1B:
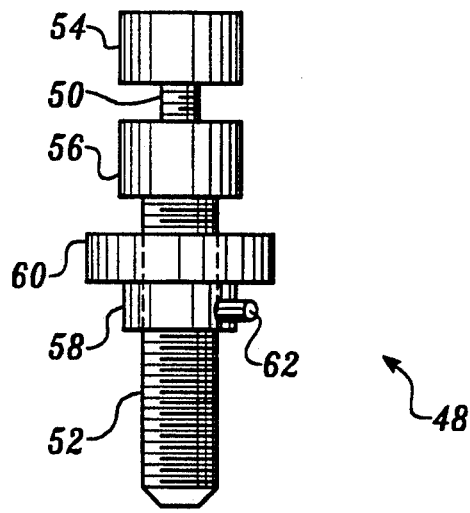
FIG. 1B is an elevation view of the resin injector of the present invention.

Referring now to FIG. 1B, the resin injector can be described. The resin injector 48 has a top portion 50 and a bottom portion 52. The top portion is threadably connected to the bottom portion 52. The top portion 50 and bottom portion 52 of resin injector 48 both have finger handles designated 54 and 46, respectively. The top portion 50 is used as a piston to force a charge of resin through the bottom portion 52 into the break in the glass body when turned clockwise. Functionally, this type of injector is well known in the prior art, as evidenced in U.S. Pat. No. 4,569,808 issued to Smali. The resin is precharged into a cavity (not shown) within the bottom portion 52 of resin injector 48. In addition to the features of the conventional resin injectors, the resin injector 48 of the present invention has an outer sleeve 58 which receives the bottom portion 52 of injector 48 in a threaded manner. The outer sleeve 58 has a finger handle 60 and a flange 62 which matingly engages flange 46 of quick release assembly 44, when injector 48 is disposed within slot 28.

In operation, the bridge 10 can be aligned adjacent to the break in the glass body to be repaired with slot 28 open. The position indicator 30 can then be inserted into the slot 28. The flange 42 on the position indicator 30 can be aligned with the flange 46 of quick release assembly 44 so that a quarter turn of the position indicator will lock the position indicator into place. The elongated portion 36 of the indicator 30 can be adjusted vertically until the tip 38 is touching a predetermined point in the break such as its center. The adjustable brace 22 can then be adjusted vertically to obtain proper levelling of the bridge 10. Finally, the handle 18 of the fastener 16 can be pushed forward to force rubber suction cup 20 to engage the glass body thereby fixing the apparatus to the glass body. The position indicator 30 can then be "unlocked" from the bridge by a quarter turn counter-clockwise and removed therefrom. Now resin injector 48 can be disposed in slot 28 and locked thereto with a quarter turn engaging flange 62 with flange 46 of quick release assembly 44. The resin injector 10 can be adjusted vertically over the break and resin injected into the break by the turning of handle 54 thereby threading top portion 50 of injector 48 into bottom portion 52 causing the resin in the precharged cavity to flow into the break in the glass body.

The apparatus eliminates the need for continual adjustment of the bridge in relation to the break as the position indicator has performed that function. Further, the apparatus provides for accurate injection of the resin thereby decreasing operator mistakes and increasing efficiency.

The invention may be embodied in the form without departing from the spirit or essential characteristics thereof. The present embodiments are therefore to be considered in all respects as illustrative and not restrictive, the scope of the invention being indicated by the appended claims rather than the foregoing description, and all change which comes within the meaning and range of equivalency of claims are intended to be embraced therein.

What I claim is:

1. Apparatus for use in repairing breaks in glass bodies comprising
   a. a bridge having a slot disposed therein, said bridge having a flange positioned over said slot;

b. attachment means disposed within said bridge, said attachment means having a fastening surface which contacts a glass body to be repaired;
c. levelling means disposed within said bridge for levelling said bridge with respect to said glass body to be repaired;
d. position indicating means adapted to fit within said slot in said bridge, and to contact a break in said glass body at a predetermined point, thereby allowing accurate positioning of said bridge over said glass body to be repaired; said position indicating means having a flange connected thereto for mating engagement with said flange positioned over said slot of said bridge thereby fixing said position indicating means when said position indicating means is disposed within said slot and rotated;
e. resin injecting means adapted to fit within said slot in said bridge after said position indicating means has allowed accurate positioning of said bridge and has been removed from said slot in said bridge, said resin injecting means injecting resin into said break in said glass body, said resin injecting means having a flange connected thereto for mating engagement with said flange positioned over said slot of said bridge thereby fixing said resin injecting means when said resin injecting means is disposed within said slot.

2. A method for repairing breaks in glass bodies comprising
a. aligning a repair bridge having an open slot disposed therein adjacent to a break in a glass body to be repaired, said bridge having a flange positioned over said slot;
b. inserting position indicating means into said slot of said repair bridge, said position indicating means contacting said break in said glass body at a predetermined point; said position indicating means having a flange connected thereto for mating engagement with said flange of said bridge;
c. locking said position indicating means to said bridge by rotating said position indicating means so as to cause mating engagement of said flange of said bridge and said flange of said position indicating means;
d. levelling said bridge using levelling means attached to said bridge;
e. fastening said bridge to said glass body using fastening means attached to said bridge;
f. removing said position indicating means from said slot of said bridge;
g. inserting resin injecting means into said slot of said bridge; said resin injecting means having a flange connected thereto for mating engagement with said flange of said bridge;
h. locking said resin injecting means to said bridge by rotating said resin injecting means so as to cause mating engagement of said flange of said bridge and said flange of said resin injecting means; and
i. injecting means from said resin injecting means into said break in said glass body to repair said break.

* * * * *